United States Patent
Kim et al.

(10) Patent No.: US 11,516,403 B2
(45) Date of Patent: Nov. 29, 2022

(54) ELECTRONIC DEVICE AND IMAGING-RELATED INFORMATION GUIDING METHOD THEREOF

(71) Applicant: Samsung Electronics Co., Ltd., Suwon-si (KR)

(72) Inventors: Yoonyoung Kim, Suwon-si (KR); Joohoan Do, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/385,667

(22) Filed: Jul. 26, 2021

(65) Prior Publication Data

US 2021/0352220 A1     Nov. 11, 2021

Related U.S. Application Data

(63) Continuation of application No. PCT/KR2019/017887, filed on Dec. 17, 2019.

(30) Foreign Application Priority Data

Feb. 22, 2019     (KR) .......................... 10-2019-0021306

(51) Int. Cl.
    *H04N 5/232*        (2006.01)
    *H04M 1/02*         (2006.01)
    *H04N 5/225*        (2006.01)

(52) U.S. Cl.
    CPC .... *H04N 5/232941* (2018.08); *H04M 1/0264* (2013.01); *H04N 5/2256* (2013.01); *H04N 5/2257* (2013.01); *H04N 5/23232* (2013.01)

(58) Field of Classification Search
    CPC .... H04N 5/2256; H04N 5/2257; H04N 5/232; H04N 5/23216; H04N 5/23232; H04N 5/232941
    See application file for complete search history.

(56) References Cited

U.S. PATENT DOCUMENTS 6,304,284 B1 * 10/2001 Dunton .............. H04N 5/23238
                                                   386/E5.069
6,608,996 B1     8/2003 Laurikka et al.
(Continued)

FOREIGN PATENT DOCUMENTS

JP        2004-280277 A     10/2004
KR       10-1645427 B1      8/2016
(Continued)

OTHER PUBLICATIONS

International Search Report dated Apr. 13, 2020 in connection with International Patent Application No. PCT/KR2019/017887, 2 pages.

*Primary Examiner* — Amy R Hsu

(57) ABSTRACT

An electronic device according to an embodiment comprises: a front plate; a housing comprising a rear plate facing the front plate; a display exposed through at least one part of the front plate; a camera exposed through a first part of the rear plate; a plurality of first light-emitting diodes exposed through a second part of the rear plate near the first part; a processor operatively connected to the display, camera and plurality of first light-emitting diodes; and memory operatively connected to the processor. The memory, during execution, delays an imaging point by designated time and confirms whether or not a first function of imaging a still image has been configured if the processor receives a first input associated with imaging of the still image by means of the camera, and can store instructions, for guiding with respect to a degree in which the imaging point is reached, by means of the plurality of first light-emitting diodes if the first function has been configured.

19 Claims, 16 Drawing Sheets

(56) References Cited

U.S. PATENT DOCUMENTS

| | | | |
|---|---|---|---|
| 9,465,520 B2 | 10/2016 | Mestre | |
| 9,584,641 B2 | 2/2017 | Mestre | |
| 9,906,257 B2 | 2/2018 | Choi | |
| 10,388,121 B2 | 8/2019 | Gupta et al. | |
| 10,444,005 B1* | 10/2019 | Dryer | G06F 3/0488 |
| 2013/0298039 A1* | 11/2013 | Mestre | H04W 4/60 |
| | | | 715/753 |
| 2014/0168494 A1* | 6/2014 | Hong | G06F 1/3287 |
| | | | 348/333.01 |
| 2016/0226547 A1 | 8/2016 | Choi | |
| 2016/0381195 A1 | 12/2016 | Mestre | |
| 2017/0118402 A1 | 4/2017 | Bok et al. | |
| 2017/0365135 A1 | 12/2017 | Gupta et al. | |
| 2018/0213166 A1 | 7/2018 | Kim et al. | |

FOREIGN PATENT DOCUMENTS

| | | |
|---|---|---|
| KR | 10-2017-0046915 A | 5/2017 |
| KR | 10-2018-0087766 A | 8/2018 |

\* cited by examiner

ELECTRONIC DEVICE AND IMAGING-RELATED INFORMATION GUIDING METHOD THEREOF

CROSS-REFERENCE TO RELATED APPLICATIONS

This application is a continuation of International Application No. PCT/KR2019/017887 filed on Dec. 17, 2019, which claims priority to Korean Patent Application No. 10-2019-0021306 filed on Feb. 22, 2019, the disclosures of which are herein incorporated by reference in their entirety.

BACKGROUND

1. Field

Embodiments disclosed in the disclosure relate to a filming information guide technology.

2. Description of Related Art

An electronic device may include a display exposed through a front surface of the electronic device and a camera (hereinafter, referred to as a 'rear surface camera') exposed through a rear surface of the electronic device, and display an image acquired using the camera through the display.

When filming an external object located at the rear of the electronic device using the rear surface camera, the user may film an image of the external object while identifying the external object being filmed in real time through the display.

However, when a user films himself using a rear surface camera (e.g., takes a selfie), the user is not able to identify a display in real time, so that it was difficult to determine whether the filming is being performed properly.

Various embodiments disclosed in the disclosure provide an electronic device and a filming-related information guiding method thereof that may guide filming-related information using light emitting elements arranged on a rear surface of the electronic device.

SUMMARY

An electronic device according to an embodiment disclosed in the disclosure includes a housing including a front surface plate, and a rear surface plate opposite to the front surface plate, a display exposed through at least a portion of the front surface plate, a camera exposed through a first portion of the rear surface plate, a plurality of first light emitting elements exposed through a second portion of the rear surface plate around the first portion, a processor operatively connected to the display, the camera, and the plurality of first light emitting elements, and a memory operatively connected to the processor, and the memory stores instructions that, when executed, cause the processor to determine whether a first function of filming a still image by delaying a filming time point by a specified time when a first input related to the filming of the still image using the camera is received is set, and guide an extent of reaching of the filming time point using the plurality of first light emitting elements when the first function is set.

A method for guiding filming-related information by an electronic device according to an embodiment disclosed in the disclosure includes an operation of receiving a first input related to filming of a still image using a camera exposed through a first portion of a rear surface plate of the electronic device, an operation of determining whether a first function for filming the still image by delaying a filming time point by a specified time is set when the first input is received, and an operation of guiding an extent of reaching of the filming time point using a plurality of first light emitting elements exposed through a second portion of the rear surface plate when a timer filming function is set.

According to the embodiments disclosed in the disclosure, the filming-related information may be guided through the rear surface of the electronic device, so that convenience of filming using the rear surface camera may be increased. In addition, various effects that are directly or indirectly identified through the disclosure may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In relation to the illustration of the drawings, the same or similar reference numerals may be used for the same or similar components.

DETAILED DESCRIPTION

Figure 1:
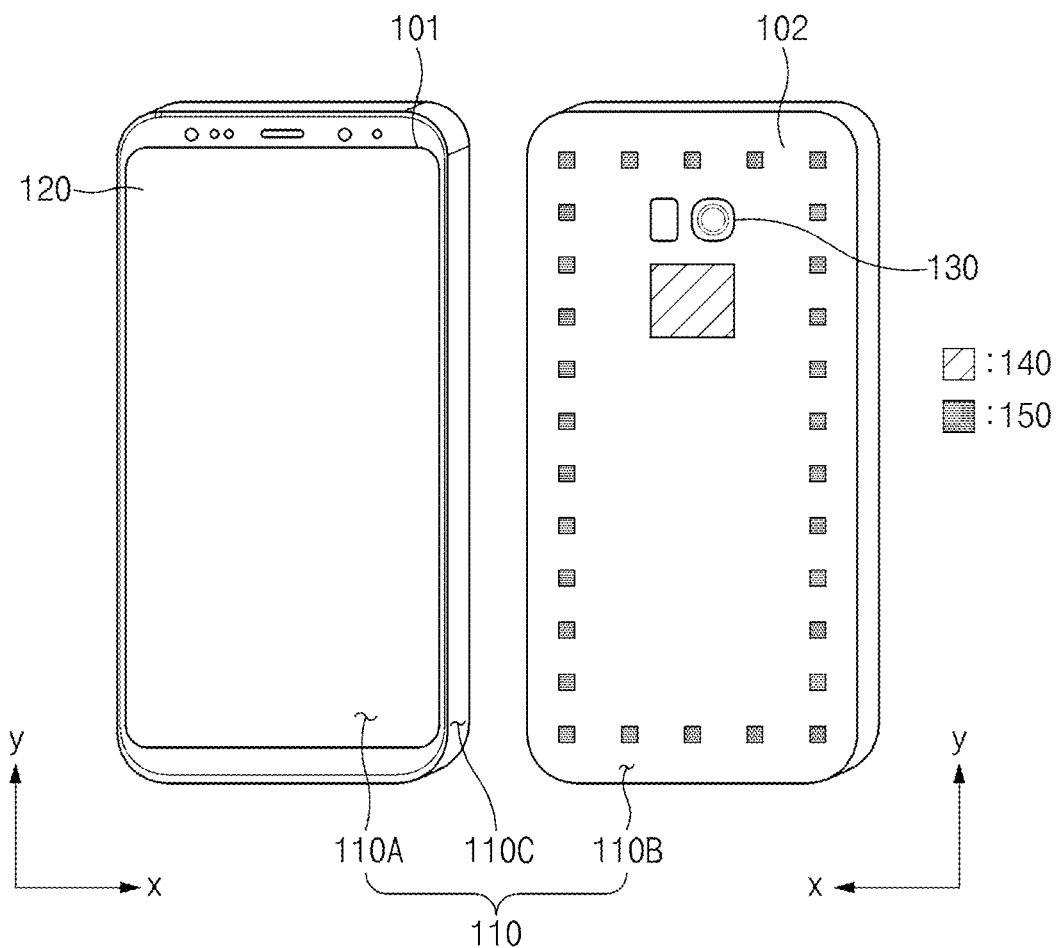
FIG. 1 shows a perspective view of a first surface and a second surface of an electronic device according to an embodiment.
Figure 2:
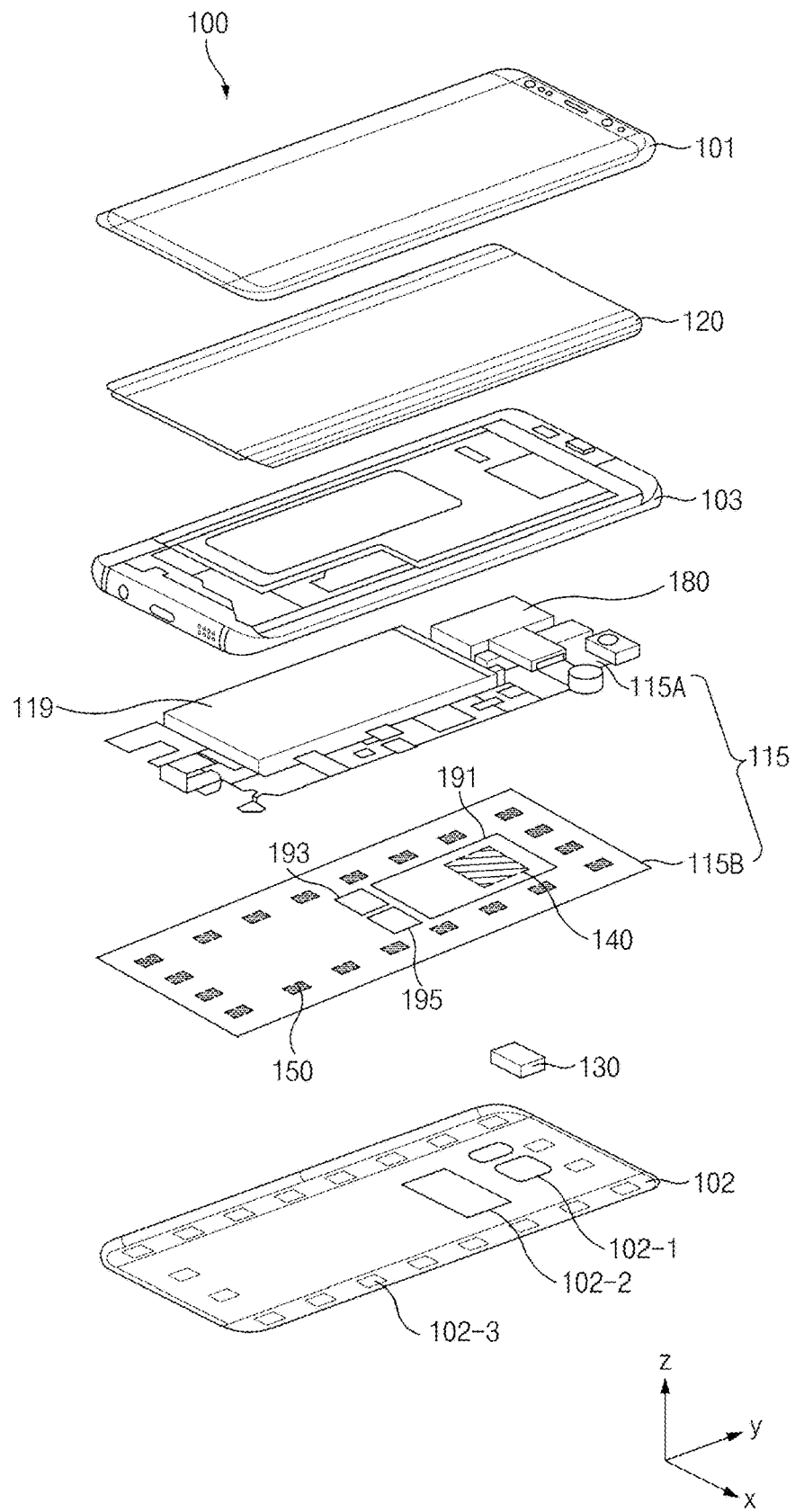
FIG. 2 shows an exploded perspective view of an electronic device according to an embodiment.

FIG. 1 shows a perspective view of a first surface 110A and a second surface 110B of an electronic device according to an embodiment, and FIG. 2 shows an exploded perspective view of an electronic device according to an embodiment.

Referring to FIGS. 1 and 2, an electronic device 100 according to an embodiment may include a housing 110 including the first surface 110A, the second surface 110B, and a side surface 110C enclosing a space between the first surface 110A and the second surface 110B. In another embodiment, the housing may refer to a structure that forms a portion of the first surface 110A, the second surface 110B, and the side surface 110C in FIG. 1.

According to one embodiment, the first surface 110A may be formed by an at least partially transparent front surface plate 101 (e.g., a glass plate including various coating layers, or a polymer plate). The second surface 110B may be formed by a substantially opaque rear surface plate 102. The rear surface plate 102 may be formed by, for example, coated or tinted glass, ceramic, polymer, metal (e.g., aluminum, stainless steel, or magnesium), or a combination of at least two of the above materials. A first portion 102-1, a second portion 102-2, and a third portion 102-3 of the rear surface plate 102 may be formed to be substantially transparent. The side surface 110C may be coupled to the front surface plate 101 and the rear surface plate 102, and may be formed by a side surface bezel structure (or a "side surface member") 103 containing metal and/or polymer. In some embodiments, the rear surface plate 102 and the side surface bezel structure 103 may be integrally formed and contain the same material (e.g., a metallic material such as aluminum).

According to one embodiment, the electronic device 100 may, for example, include a printed circuit board 115, a display 120, a camera 130, a plurality of first light emitting elements 140, and a plurality of second light emitting elements 150 inside the housing 110. In one embodiment, the electronic device 100 may omit some of the components shown in FIGS. 1 and 2 or may further include other components. For example, the electronic device 100 may omit the plurality of second light emitting elements 150. As another example, the electronic device 100 may further include a battery 119 for supplying power to each component of the electronic device 100.

According to one embodiment, the printed circuit board 115 may include a first printed circuit board 115A; and a second printed circuit board 115B. The first printed circuit board 115A may mount a processor 180, and the first printed circuit board 115A may mount the plurality of first light emitting elements 140 and the plurality of second light emitting elements 150. The display 120 and the camera 130 may be mounted on the first printed circuit board 115A or may be connected to the first printed circuit board 115A through a connector. The second printed circuit board 115B may be connected to the first printed circuit board 115A through a wired interface of at least one of a flexible printed circuit board (FPCB) and/or a connector. Alternatively, the second printed circuit board 115B may be connected to the first printed circuit board 115A through a wireless interface. In this case, the second printed circuit board 115B may mount an antenna 191, a power management circuit 193, and a further processor 195. The antenna 191 (e.g., an antenna for NFC communication) may receive power from the second printed circuit board 115B, and the power management circuit 193 (e.g., a rectifying circuit) may rectify (and convert a level of) the received power and provide the rectified power to the further processor 195 (e.g., an IC for authentication), the plurality of first light emitting elements 140, and the plurality of second Light emitting elements 150. The further processor 195 may interact (e.g., communicate) with the processor 180 to control the plurality of first light emitting elements 140 and the plurality of second light emitting elements 150. The further processor 195, the plurality of first light emitting elements 140, and the plurality of second light emitting elements 150 may be mounted at locations that do not interfere with wireless power transmission and reception.

According to one embodiment, the display 120 may be exposed through at least a portion of the front surface plate 101. Alternatively, the camera 130, the plurality of first light emitting elements 140, and the plurality of second light emitting elements 150 may be exposed through the rear surface plate 102. For example, the camera 130 may be exposed through the first portion 102-1 of the rear surface plate 102, the plurality of first light emitting elements 140 may be exposed through the second portion 102-2 of the rear surface plate 102, and the plurality of second light emitting elements 150 may be exposed through the second portion 102-3 of the rear surface plate 102.

According to one embodiment, the plurality of first light emitting elements 140 may be densely arranged in a predetermined shape. The predetermined shape may include, for example, a rectangular shape, a circular shape, an oval shape, or a rectangular shape with rounded corners. For example, the plurality of first light emitting elements 140 may be arranged in an 8*8 array, and may form the rectangular shape as a whole. The plurality of first light emitting elements 140 may be exposed through the second portion 102-2 of the rear surface plate 102. The second portion 102-2, which is, for example, a peripheral region (e.g., a lower region) of the first portion of the rear surface plate 102, may be formed in a predetermined shape capable of exposing each of the plurality of first light emitting elements 140.

According to one embodiment, the plurality of second light emitting elements 150 may be arranged, for example, along at least one of a top edge, a bottom edge, a left edge, and/or a right edge of the rear surface plate 102. For example, the plurality of second light emitting elements 150 may be arranged in an outline shape (e.g., a rectangular shape) of the rear surface plate 102 as a whole along the edges of the rear surface plate 102. In another example, the plurality of second light emitting elements 150 may be arranged in a row (or a plurality of rows) on each of the top edge and the bottom edge of the rear surface plate 102, or in a row (or a plurality of rows) on each of the left edge and the right edge of the rear surface plate 102. The plurality of second light emitting elements 150 may be exposed through the second portion 102-3 of the rear surface plate 102. The second portion 102-3 may be formed to expose each of the plurality of second light emitting elements 150. In the disclosure, the case in which the plurality of second light emitting elements 150 are arranged along the edges of the rear surface plate 102 will be described as an example.

According to one embodiment, the plurality of first light emitting elements 140 and the plurality of second light emitting elements 150 may emit light or be turned off under control of the processor 180 to guide filming-related information. For example, the plurality of first light emitting elements 140 may guide an extent to which a filming time point of a still image has reached in a timer filming mode. The timer filming mode may be, for example, a mode for filming the still image by delaying the filming time point of the still image by a specified time.

According to the embodiment described above, the electronic device 100 may guide the filming-related information through the rear surface of the electronic device 100, thereby supporting a user to easily identify a filming situation when the user is not able to identify the display during filming using the camera 130.

Figure 3:
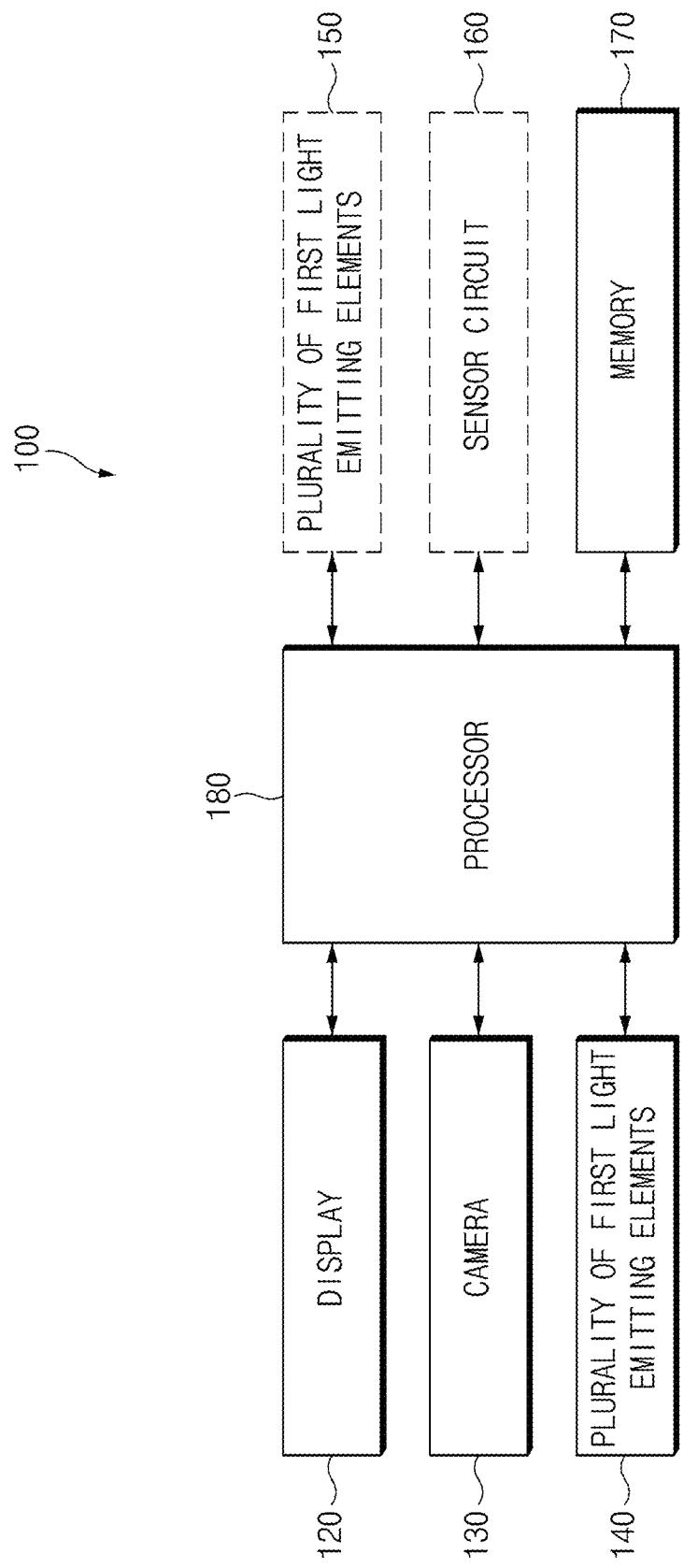
FIG. 3 shows a block diagram of an electronic device according to an embodiment.

FIG. 3 shows a block diagram of an electronic device according to an embodiment.

Referring to FIG. 3, the electronic device 100 (e.g., the electronic device 100 in FIG. 1) according to an embodiment may include the display 120 (e.g., the display 120 in FIG. 1), the camera 130 (e.g., the camera 130 in FIG. 1), the plurality of first light emitting elements 140 (e.g., the plurality of first light emitting elements 140), a memory 170, and the processor 180 (e.g., the processor 180 in FIG. 1). In one embodiment, the electronic device 100 may omit some components or further include additional components. For example, the electronic device 100 may further include the plurality of second light emitting elements 150 (e.g., the plurality of second light emitting elements 150 in FIG. 1). As another example, the electronic device 100 may further include a sensor circuit 160. In one embodiment, some of the components of the electronic device 100 may be coupled to each other to form a single entity, but perform functions of the corresponding components prior to the coupling.

According to one embodiment, the display 120 may display, for example, various contents (e.g., a text, an image, a video, an icon, and/or a symbol). The display 120 may include, for example, a liquid crystal display (LCD), a light emitting diode (LED) display, an organic light emitting diode (OLED) display, or an electronic paper display. The display 120 may be a touch screen display coupled to an input circuit (e.g., a touch sensor). The display 120 may be exposed through at least the portion of the front surface plate 101 (e.g., the front surface plate 101 in FIG. 2).

According to one embodiment, the camera 130 may film the still image or a moving image. The camera 130 may be exposed through the first portion (e.g., a center of an upper portion) (e.g., the first portion 102-1 in FIG. 2) of the rear surface plate 102 (e.g., the rear surface plate 102 in FIG. 2).

According to one embodiment, the plurality of first light emitting elements 140 may be densely arranged in the predetermined shape. The predetermined shape may include, for example, the rectangular shape, the circular shape, the oval shape, or the rectangular shape with the rounded corners. For example, the plurality of first light emitting elements 140 may be arranged in an N*N rectangular shape. The plurality of first light emitting elements 140 may be exposed through the second portion 102-2 of the rear surface plate 102 around the first portion 102-1. The number of plurality of first light emitting elements 140 may vary.

According to one embodiment, the plurality of second light emitting elements 150 may be arranged following a specified rule (or irregularly) on the rear surface plate 102. For example, the plurality of second light emitting elements 150 may be arranged in the row (or the plurality of rows) along the at least one of the top edge, the bottom edge, the left edge, and/or the right edge. As another example, the plurality of second light emitting elements 150 may be arranged in the row along the edges of the rear surface plate 102 to be arranged in the outline shape of the rear surface plate 102 as a whole. The plurality of second light emitting elements 150 may be exposed through the second portion 102-3 of the rear surface plate 102. The number of plurality of second light emitting elements 150 may vary.

According to one embodiment, the sensor circuit 160 may include a first sensor circuit capable of sensing a movement of the electronic device 100, and a second sensor circuit for sensing grip of the user on the side surface (e.g., 110C in FIG. 1) of the electronic device 100. The first sensor circuit 160 may include, for example, at least one of a gyro sensor and/or an acceleration sensor. The first sensor circuit 160 may further include a geomagnetic sensor. The second sensor circuit may include at least one of a pressure sensor and/or a proximity sensor disposed on the side surface 110C of the electronic device 100. For example, a plurality of pressure sensors may be disposed on the side surface of the electronic device 100 to sense a pressure resulted from the grip of the user. The proximity sensor may, for example, be disposed on the side surface of the electronic device 100 to sense proximity resulted from the grip of the user. According to various embodiments, the second sensor circuit may be constructed to sense grip of the user on the first surface 110A or the second surface 110B of the electronic device 100.

The memory 170 may store, for example, a command or data related to at least one other component of the electronic device 100. The memory 170 may be a volatile memory (e.g., a RAM), a non-volatile memory (e.g., a ROM and a flash memory), or a combination thereof. The memory 170 may store instructions, that, when executed, allows the processor 180 to determine whether a first function (e.g., a timer filming function) for filming the still image by delaying the filming time point by a specified time set when a first input related to the filming of the still image using the camera 130 is received, and guides the extent to which the filming time point of the still image has reached using the plurality of first light emitting elements 140 when the first function is set.

The processor 180 may execute an operation or data processing related to control and/or communication of at least one other component of the electronic device 100 using the instructions stored in the memory 170. The processor 180 may, for example, include at least one of a central processing unit (CPU), a graphics processing unit (GPU), a microprocessor, an application processor, an application specific integrated circuit (ASIC), and/or a field programmable gate array (FPGA), and may have a plurality of cores.

According to one embodiment, when receiving an input related to driving of the camera 130, the processor 180 may activate the camera 130 and display an image acquired through the camera 130 through the display 120 in real time (a preview mode). In addition, when receiving an input related to the filming of the still image or the moving image, the processor 180 may film the image using the camera 130 and store the filmed image in the memory 170 (a filming mode).

According to one embodiment, when receiving an input related to the still image filming (hereinafter, referred to as a 'first input'), the processor 180 may determine whether the first function (e.g., the timer filming function) for filming the still image by delaying the filming time point by the specified time is set. The filming time point may be, for example, a time point for reading out the still image from the camera 130 after receiving the input related to the still image filming. The specified time may be, for example, a time set by a user input. The first function may be set before the reception of the first input in the preview mode, for example. In one embodiment, when a filming time point when the first function is not set is after a first time (e.g., 1 second) after receiving the first input, a filming time point when the first function is set may be after a sum of the first time and the specified time (e.g., 5 seconds) after receiving the first input.

According to one embodiment, when the first function is set, the processor 180 may indicate a progression of a filming delay using at least the plurality of first light emitting elements 140. For example, the processor 180 may use the plurality of first light emitting elements 140 to display at least one of a character, a symbol, and/or a number corresponding to the extent to which the filming time point has reached. As another example, the processor 180 may display numbers (e.g., 3→2→1) counting down the filming time point using the plurality of first light emitting elements 140 before the filming time point, and may display a symbol (e.g., a camera shape) indicating the filming time point using the plurality of first light emitting elements 140 at the filming time point.

According to one embodiment, the processor 180 may indicate a progression of a filming delay using the plurality of second light emitting elements 150. In this case, the processor 180 may light a larger number of second light emitting elements among the plurality of second light emitting elements 150 as the filming time point becomes closer. For example, the processor 180 may light a second light emitting element disposed on one side (e.g., a right side) of a top of the rear surface plate 102 and a second light emitting element disposed on the other side (e.g., a left side) of a bottom of the rear surface plate 102 among the plurality of second light emitting elements 150 first, and then sequentially light the remaining second light emitting elements in a counterclockwise (or clockwise) direction after the firstly lighted second light emitting elements. As another example, the processor 180 may sequentially light second light emitting elements arranged on the bottom of the rear surface plate 102 in a direction from the other side to one side while sequentially lighting second light emitting elements arranged on the top of the rear surface plate 102 among the plurality of second light emitting elements 150 in a direction from one side to the other side. After all of the second light emitting elements arranged on the top and the bottom of the rear surface plate 102 are lit, the processor 180 may sparsely light second light emitting elements arranged on the left side of the rear surface plate 102 in a unit of a first specified number (e.g., 3) in a direction from the top to the bottom, and may sparsely light second light emitting elements arranged on the right side of the rear surface plate 102 in a unit of a specified number in a direction from the bottom to the top. Thereafter, the processor 180 may light second light emitting elements that are not lit among the second light emitting elements arranged on the left and right sides of the rear surface plate 102. As another example, the processor 180 may sequentially (e.g., in a direction from the left side to the right side or in a direction from the right side to the left side) light and sequentially turn off at least some of the plurality of second light emitting elements 150 at least once, and then, sequentially light the plurality of second light emitting elements 150 based on the extent to which the filming time point has reached in the above-described manner. The lighting orders of the plurality of second light emitting elements 150 described above may be mixed or applied to the plurality of first light emitting elements 140.

According to one embodiment, the processor 180 may light at least some of the plurality of first light emitting elements 140 with first brightness at the filming time point of the still image, and then, after the filming time point, turn off the at least some of the plurality of first light emitting elements 140 after adjusting the brightness thereof from the first brightness to second brightness less than the first brightness. For example, the processor 180 may turn off the at least some of the plurality of first light emitting elements 140 after adjusting the brightness thereof from the first brightness to a plurality of second brightness gradually darkening. The at least some of the plurality of first light emitting elements 140 may be, for example, first light emitting elements that display the symbol (e.g., the camera shape) indicating the filming time point.

According to one embodiment, the processor 180 may light at least some of the plurality of second light emitting elements 150 (e.g., all of the second light emitting elements 150) with third brightness at the filming time point of the still image, and then, after the filming time point, turn off the at least some of the plurality of second light emitting elements 150 after adjusting the brightness thereof to fourth brightness less than the third brightness at least once. For example, the processor 180 may turn off the at least some of the plurality of second light emitting elements 150 after adjusting the brightness thereof from the third brightness to a plurality of fourth brightness gradually darkening.

According to one embodiment, the processor 180 may determine whether an external object is within a specified distance range from the electronic device 100 based on the image acquired using the camera 130 in the preview mode. The preview mode, which is, for example, a mode for displaying the image acquired from the camera 130 on the display 120, may include a time point before receiving the first input or before the filming time point after receiving the first input. For example, the processor 180 may calculate a distance between the external object and the electronic device 100 based on depth information of the external object included in the image, and determine whether the calculated distance is within the specified distance range. In one embodiment, when the external object is beyond the specified distance range, the processor 180 may guide the external object to move to be within the specified distance range using the plurality of first light emitting elements 140. For example, when the external object is at a far distance exceeding an upper limit of the specified distance range from the electronic device 100, the processor 180 may display at least one (e.g., a small circle mark) of a character, a symbol, and/or a number indicating the long distance using the plurality of first light emitting elements 140. As another example, when the external object is in a close distance less than a lower limit of the specified distance range from the electronic device 100, the processor 180 may display at least one (e.g., a large circle mark) of a character, a symbol, and/or a number indicating the short distance using the plurality of first light emitting elements 140.

According to one embodiment, at the time of filming the moving image using the camera 130, the processor 180 may guide the filming-related information using at least some of the plurality of first light emitting elements 140 and the plurality of second light emitting elements 150. For example, when receiving a second input related to the moving image filming using the camera 130, the processor 180 may determine whether a second function (e.g., a slow motion filming function) for filming the moving image at a second frame rate (e.g.: 120 fps) exceeding a default set first frame rate (e.g., 30 fps) is set. When the second function is set, the processor 180 may guide that the second function is set using the plurality of first light emitting elements 140. The processor 180 may display, for example, at least one of a character, a symbol, and/or a number indicating the second function. According to various embodiments, the processor 180 may identify that the second function is set before starting the filming of the moving image or during the filming of the moving image.

According to one embodiment, the processor 180 may guide a specified event using at least some of the plurality of first light emitting elements 140 and the plurality of second light emitting elements 150. The specified event may include, for example, at least one state-related event among a call reception event informing call reception, a text message reception event informing text message reception, and/or a low battery event informing a low battery. For example, when identifying an occurrence of the call reception event, the text message reception event, or the low battery event, the processor 180 may display at least one (e.g., a phone shape, a text message shape, or a battery shape) of a character, a symbol, or a number indicating each event using the plurality of first light emitting elements 140. As another example, when identifying the occurrence of the specified event at the time after receiving the first input and before the filming time point (or in the preview mode before receiving the first input), the processor 180 may display the at least one (e.g., the phone shape, the text message shape, or the battery shape) of the character, the symbol, or the number indicating each event using the plurality of first light emitting elements 140. As another example, only when it is identified using the sensor circuit 160 that the electronic device 100 is in an inverted state (e.g., a state in which the display 120 faces the floor), the processor 180 may display at least one (e.g., the phone shape, the text message shape, the battery shape, an arrow shape, or a specific symbol shape) of the character, the symbol, or the number indicating the specified event using the plurality of first light emitting elements 140.

According to one embodiment, the processor 180 may identify a grip pattern of the user for the electronic device 100 using the sensor circuit 160, and perform a specified function based on identified grip pattern. The grip pattern may include, for example, a change pattern of the grip of the user. For example, when sensing using the sensor circuit 160 in the preview mode that the user sweeps the side surface of the electronic device 100 upwardly, the processor 180 may perform the function of guiding the filming-related information using the plurality of first light emitting elements 140 and the plurality of second light emitting elements 150. When sensing using the sensor circuit 160 in the preview mode that the user sweeps the side surface of the electronic device 100 downwardly, the processor 180 may stop performing the function of guiding the filming-related information using the plurality of first light emitting elements 140 and the plurality of second light emitting elements 150. As another example, when sensing using the sensor circuit 160 during content playback that the user sweeps the side surface of the electronic device 100 downwardly, the processor 180 may perform volume down of the content. In addition, when sensing using the sensor circuit 160 during the content playback that the user sweeps the side surface of the electronic device 100 upwardly, the processor 180 may perform volume up of the content.

According to various embodiments, the processor 180 may control the plurality of first light emitting elements 140 and the plurality of second light emitting elements 150 together, and may selectively control the plurality of first light emitting elements 140 or the plurality of second light emitting elements 150.

According to the above-described embodiment, the electronic device 100 may increase convenience of the image filming using the camera 130 exposed through the rear surface plate 102 and fun of interaction.

According to one embodiment, an electronic device (e.g., the electronic device 100 in FIG. 3) includes a housing (e.g., the housing 110 in FIG. 1) including a front surface plate (e.g., the front surface plate 101 in FIG. 2), and a rear surface plate (e.g., the rear surface plate 102 in FIG. 2) opposite to the front surface plate, a display (e.g., the display 120 in FIG. 3) exposed through at least a portion of the front surface plate, a camera (e.g., the camera 130 in FIG. 3) exposed through a first portion of the rear surface plate, a plurality of first light emitting elements (e.g., the plurality of first light emitting elements 140 in FIG. 3) exposed through a second portion of the rear surface plate around the first portion, a processor (the processor 180 in FIG. 3) operatively connected to the display, the camera, and the plurality of first light emitting elements, and a memory (e.g., the memory 170 in FIG. 3) operatively connected to the processor. The memory may store instructions that, when executed, cause the processor to determine whether a first function of filming a still image by delaying a filming time point by a specified time when a first input related to the filming of the still image using the camera is received is set, and guide an extent of reaching of the filming time point using the plurality of first light emitting elements when the first function is set.

The instructions may cause the processor to display at least one of a character, a symbol, and/or a number indicating the extent of the reaching of the filming time point such that the filming time point is distinguished from a time before the filming time point.

The instructions may cause the processor to light at least some of the plurality of first light emitting elements with first brightness at the filming time point, and adjust the brightness of the at least some of the plurality of first light emitting elements from the first brightness to second brightness less than the first brightness and then turn off the at least some of the plurality of first light emitting elements after the filming time point.

The electronic device may further include a plurality of second light emitting elements (e.g., the plurality of second light emitting elements 150 in FIG. 3) exposed through a third portion of the rear surface plate, and the instructions may cause the processor to sequentially light the plurality of second light emitting elements based on the extent of the reaching of the filming time point.

The instructions may cause the processor to sequentially light and sequentially turn off at least some of the plurality of second light emitting elements at least once, and then, sequentially light the plurality of second light emitting elements based on the extent of the reaching of the filming time point.

The instructions may cause the processor to light the plurality of second light emitting elements with third brightness at the filming time point, and adjust the brightness of the plurality of second light emitting elements to fourth brightness less than the third brightness at least once and then turn off the plurality of second light emitting elements after the filming time point.

The instructions may cause the processor to stop guiding the extent of the reaching of the filming time point, and guide a specified event when the specified event occurs while guiding the extent of the reaching of the filming time point.

The instructions may cause the processor to determine whether an external object is within a specified distance range from the electronic device based on an image acquired using the camera, and guide a movement of the external object using the plurality of first light emitting elements such that the external object is within the specified distance range when the external object is out of the specified distance range.

The electronic device may further include a sensor circuit (e.g., the sensor circuit 160 in FIG. 3) capable of sensing grip of a user on the electronic device, and the instructions may cause the processor to set or cancel a function of guiding the extent of the reaching of the filming time point based on a pattern of the grip sensed using the sensor circuit.

The instructions may cause the processor to determine whether a second function for filming a moving image at a second frame rate exceeding a default set first frame rate is set when receiving a second input related to the filming of the moving image using the camera, and guide that the second function is set using the plurality of first light emitting elements when the second function is set.

The instructions may cause the processor to guide a specified event using the plurality of first light emitting elements when the specified event occurs while filming the moving image after the second input is received.

Figure 4A:
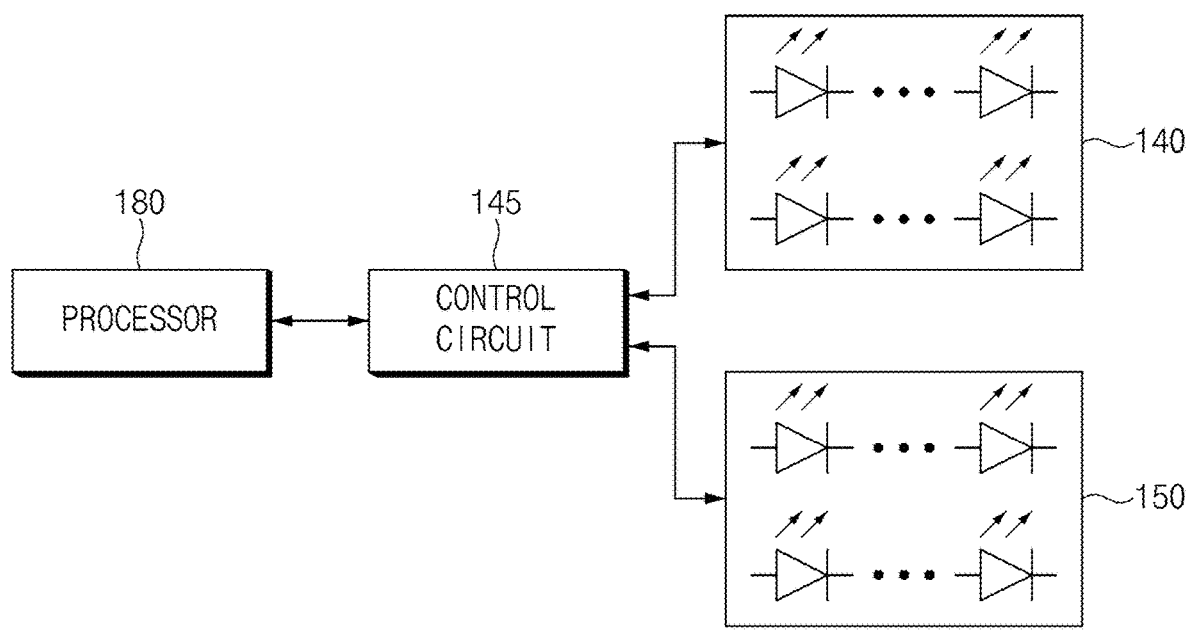
FIG. 4A shows an interface between a processor and a plurality of light emitting elements according to an embodiment.

FIG. 4A shows a detailed block diagram of a processor and a plurality of light emitting elements (e.g., the plurality of first light emitting elements 140 and the plurality of second light emitting elements 150 in FIG. 3) according to an embodiment.

Referring to FIG. 4A, a control circuit 145 may be included between the processor 180 and the plurality of first light emitting elements 140 and between the processor 180 and the plurality of second light emitting elements 150, according to an embodiment. The control circuit 145 may include at least one LED driver integrated circuit (IC). For example, the control circuit 145 may include a first LED driver IC electrically connected between the processor 180 and the plurality of first light emitting elements 140, and a second LED driver IC electrically connected between the processor 180 and the plurality of second light emitting elements 150. According to various embodiments, when the processor 180 includes the control circuit 145, the control circuit 145 may be omitted.

Figure 4B:
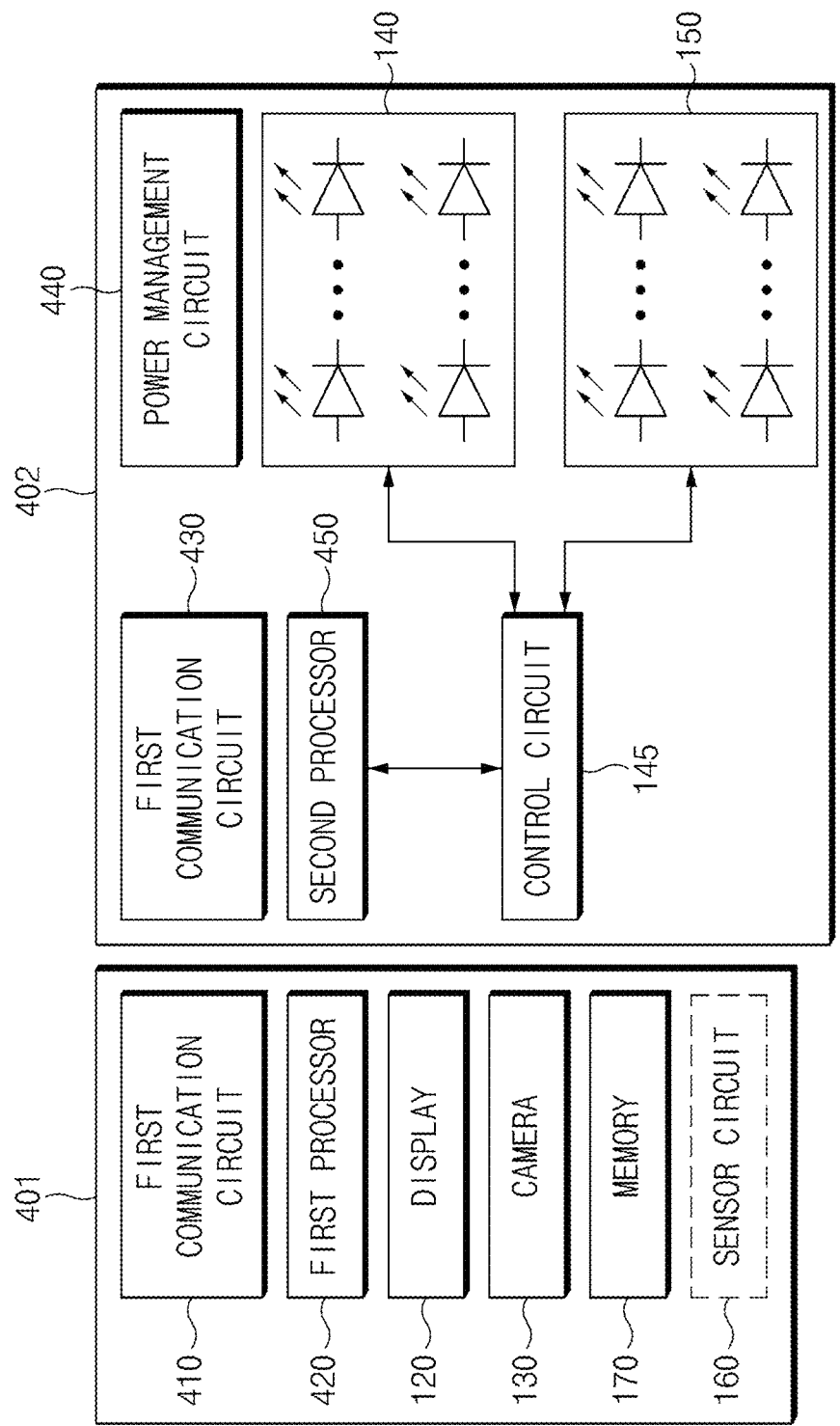
FIG. 4B shows another block diagram of an electronic device according to an embodiment.

FIG. 4B shows another block diagram of an electronic device according to an embodiment.

Referring to FIG. 4B, an electronic device (e.g., the electronic device 100 in FIG. 3) according to an embodiment may include a first electronic device (e.g., a smartphone) 401 and a second electronic device (e.g., built in a cover of the first electronic device 401). For example, the first electronic device 401 may include the display 120, the sensor circuit 160, the memory 170, the camera 130, a first communication circuit 410, and a first processor (e.g., the processor 180 in FIG. 3). A second electronic device 402 may include a second communication circuit 430 (e.g., the antenna 191 in FIG. 2), a second processor (e.g., the further processor 195 in FIG. 2), a control circuit (e.g., the control circuit 145 in FIG. 4), the plurality of first light emitting elements 140, and the plurality of second light emitting elements 150.

According to one embodiment, the first processor 420 may transmit a command for instructing to light or turn off the plurality of first light emitting elements 140 and the plurality of second light emitting elements 150 (e.g., a command for controlling the lighting and turning off described above) to the second processor 450 through the first communication circuit 410 and the second communication circuit 430. The second processor 450 may control the lighting or the turning off of the plurality of first light emitting elements 140 and the plurality of second light emitting elements 150 using the control circuit 145 in response to the command received from the first processor 420. In one embodiment, the first processor 420 and the second processor 450 may perform secure communication through an authentication process. In this case, the second processor 450 may have an authentication function or may communicate with the first processor 420 through a separate authentication chip.

According to one embodiment, the second electronic device 402 may receive power from the first electronic device 401 without including a battery separately. In this case, the second electronic device 402 may further include a power management circuit 440 (e.g., the power management circuit 193 in FIG. 2). For example, the second communication circuit 430 may receive the command and wireless power from the first communication circuit 410 through, for example, near field communication (NFC). The power management circuit 440 (e.g., a rectifier circuit) may receive power from the second communication circuit 430, rectify (convert a level of) the received power, and supply the rectified power to the second processor 450 (e.g., an IC for the authentication), the plurality of first light emitting elements 140, and the plurality of second light emitting elements 150. The second processor 450 may be driven by the supplied power, and the lighting or the turning off of the plurality of first light emitting elements 140 and the plurality of second light emitting elements 150 may be controlled using the control circuit 145 based on the received command.

According to the embodiment described above, the cover (the second electronic device 402) of the first electronic device 401 may not only simply protect the first electronic device 401, but also support to upgrade the function of the first electronic device 401.

Figure 4C:
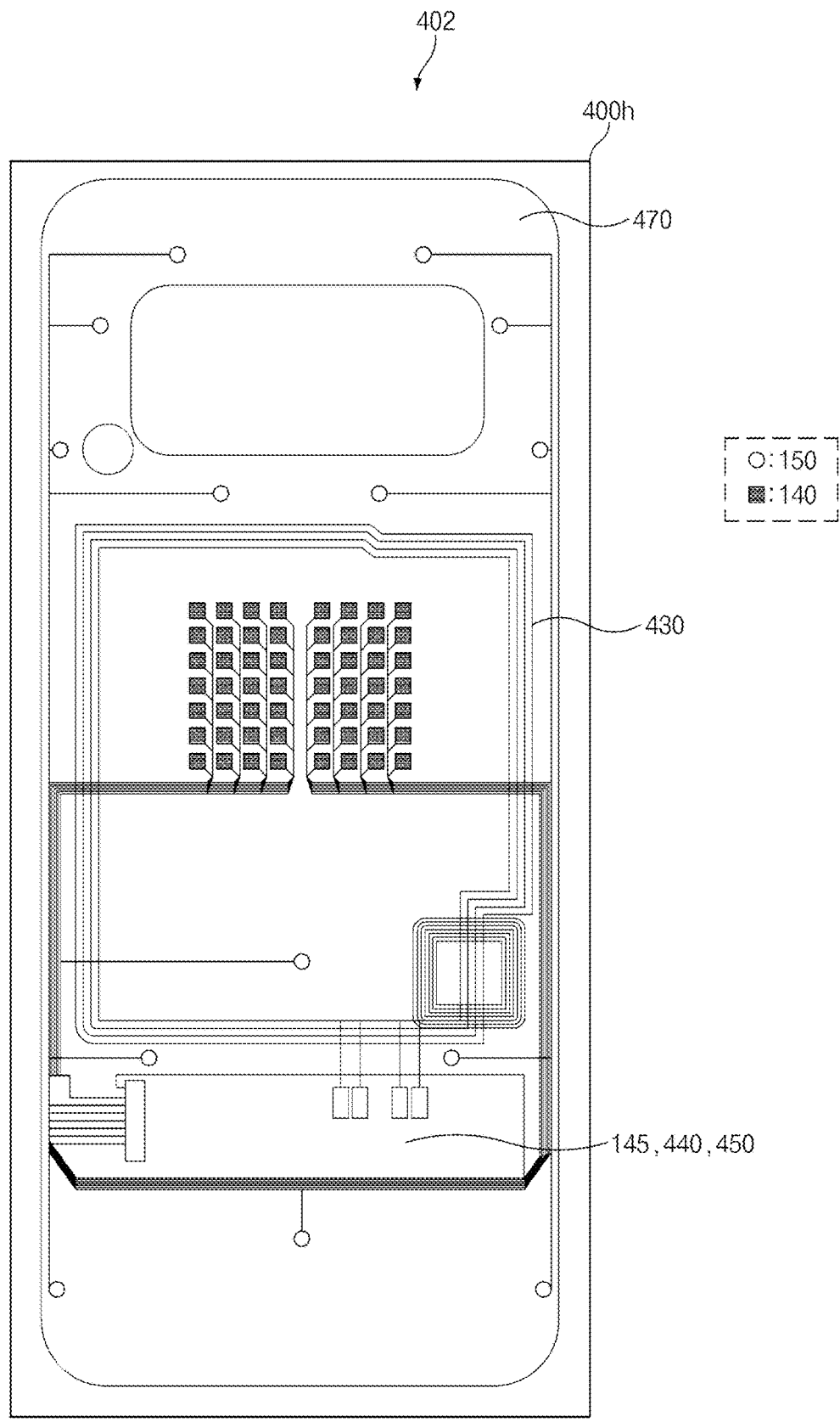
FIG. 4C shows a circuit arrangement structure of a second electronic device according to an embodiment.

FIG. 4C shows a circuit arrangement structure of a second electronic device (the second electronic device 402 in FIG. 4B) according to an embodiment.

Referring to FIG. 4C, a housing 400h of the second electronic device 402 according to an embodiment may cover at least a portion of the rear surface of the first electronic device 401, be directed in a direction in which the rear surface of the first electronic device 401 faces, and expose a camera (e.g., the camera 130 in FIG. 4B), the plurality of first light emitting elements 140, and the plurality of second light emitting elements 150. For example, the housing 400h may have a transparent region in which at least the camera 130, the plurality of first light emitting elements 140, and the plurality of second light emitting elements 150 are arranged. In addition, the housing 400h may fix a printed circuit board 470 (e.g., the second printed circuit board 115B in FIG. 2) mounting thereon the second communication circuit 430 (e.g., the antenna 191 in FIG. 2), a second processor (e.g., the second processor 450 in FIG. 4B), a control circuit (e.g., the control circuit 145 in FIG. 4), the plurality of first light emitting elements 140, and the plurality of second light emitting elements 150.

According to one embodiment, the printed circuit board 470 may mount the components (the second processor 450, the power management circuit 440, the plurality of first light emitting elements 140, and the plurality of second light emitting elements 150) of the second electronic device 402 at locations that do not interfere with wireless power transmission and reception between the first electronic device 401 and the second electronic device 402. Referring to FIG. 4C, for example, the second communication circuit 430 may be disposed in a middle region of the second electronic device 402, the plurality of first light emitting elements 140 may be arranged in a peripheral region of the camera 130, the plurality of second light emitting elements 150 may be sparsely arranged on the second electronic device 402, and the second processor 450 and the power management circuit 440 may be disposed in a lower region of the second electronic device 402. Patterns connecting the components with each other on the printed circuit board 470 may be formed, for example, on an edge of the second electronic device 402 so as not to interfere with the wireless power transmission and reception.

Figure 5A:
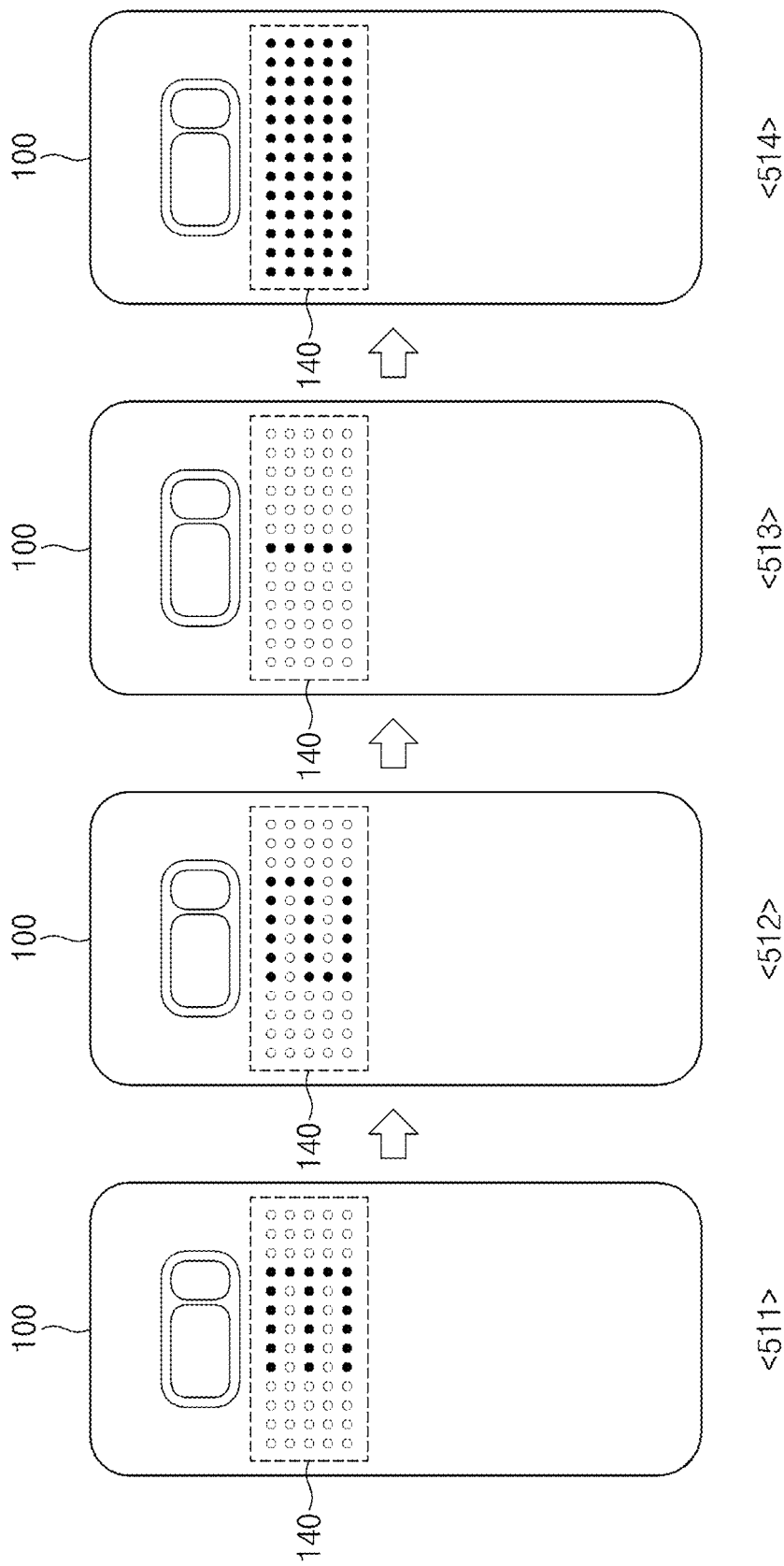
FIGS. 5A and 5B show an example of guiding an extent to which a filming time point has reached using a plurality of first light emitting elements according to an embodiment.
Figure 5B:
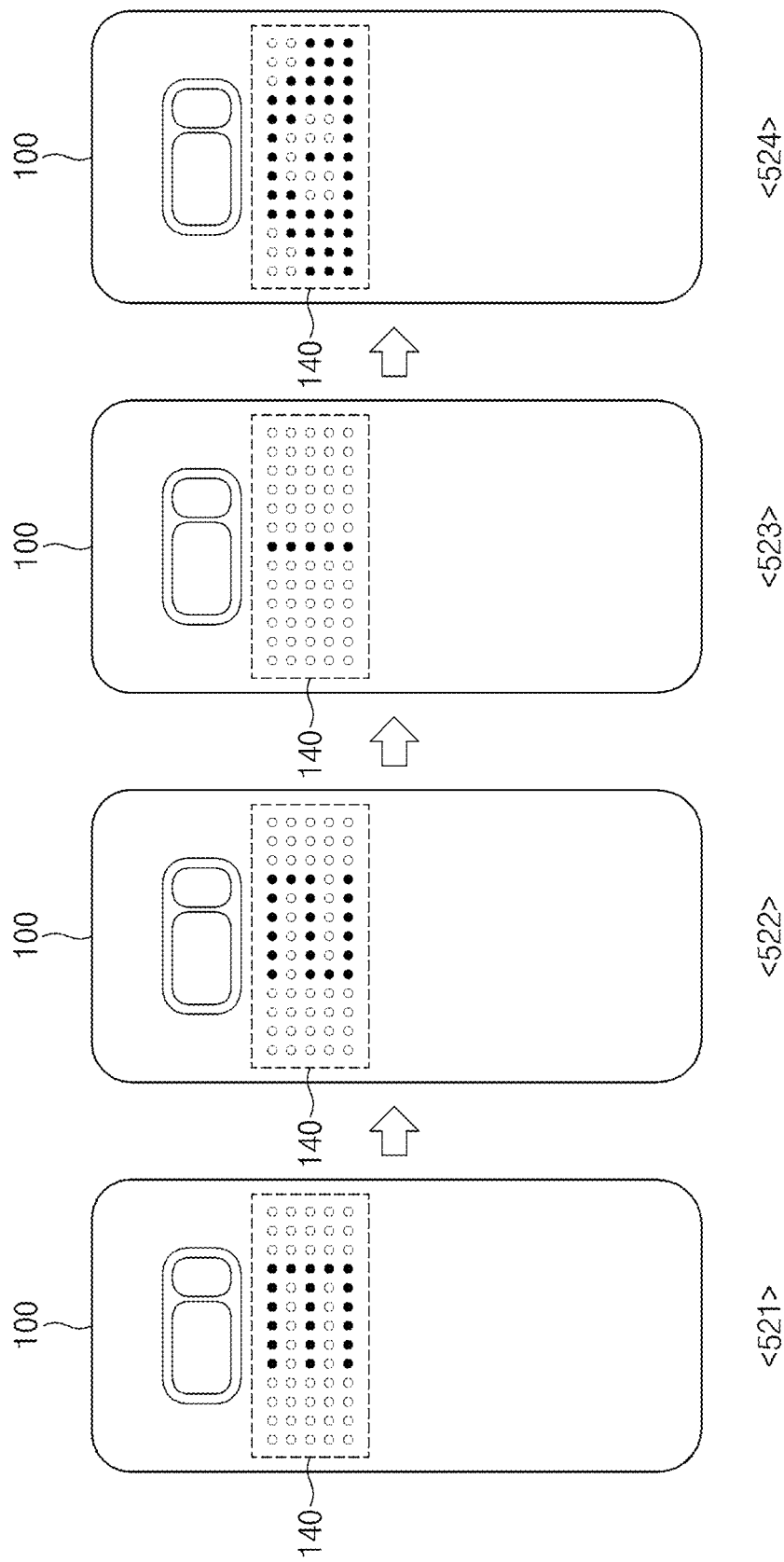

FIGS. 5A and 5B show an example of guiding an extent to which a filming time point has reached using the plurality of first light emitting elements 140 according to an embodiment.

Referring to FIG. 5A, in operation 511, the electronic device 100 (e.g., the electronic device 100 in FIG. 1) may light first light emitting elements corresponding to a number '3' among the plurality of first light emitting elements 140 when there are 3 seconds until the filming time point.

In operation 512, the electronic device 100 may light first light emitting elements corresponding to a number '2' among the plurality of first light emitting elements 140 when there are 2 seconds until the filming time point.

In operation 513, the electronic device 100 may light first light emitting elements corresponding to a number '1' among the plurality of first light emitting elements 140 when there is 1 second until the filming time point.

In operation 514, the electronic device 100 may display a symbol (e.g., a rectangular shape) indicating the filming time point by lighting all of the plurality of first light emitting elements 140 at the filming time point.

Referring to FIG. 5B, in operations 521 to 523, the electronic device 100 may respectively light first light emitting elements corresponding to numbers '3', '2', and '1' among the plurality of first light emitting elements 140 when there are 3 seconds, 2 seconds, and 1 second until the filming time point.

In operation 524, the electronic device 100 may display the camera shape indicating the filming time point using the plurality of first light emitting elements 140 at the filming time point.

Figure 6A:
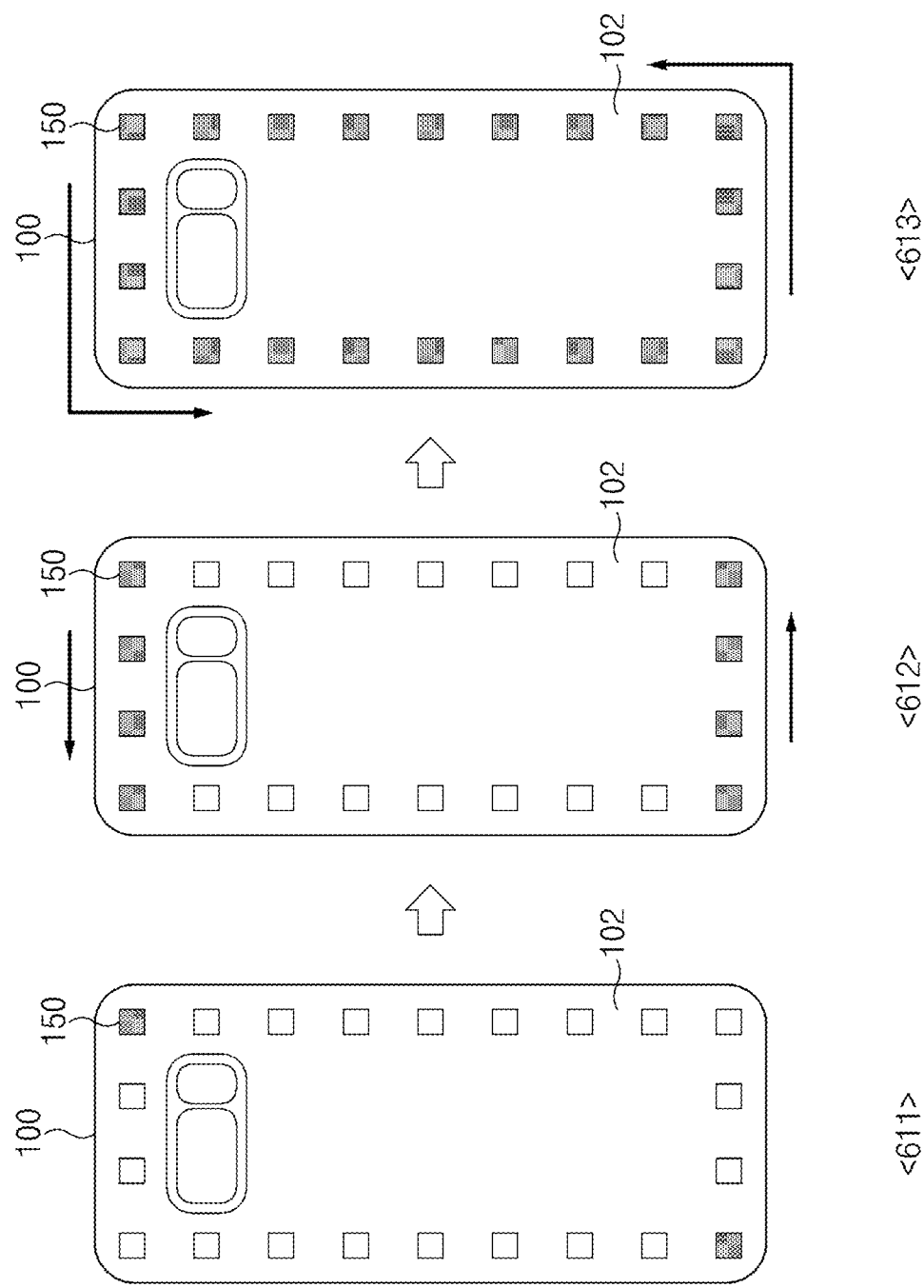
FIGS. 6A to 6C show an example of guiding an extent to which a filming time point has reached using a plurality of second light emitting elements according to an embodiment.
Figure 6B:
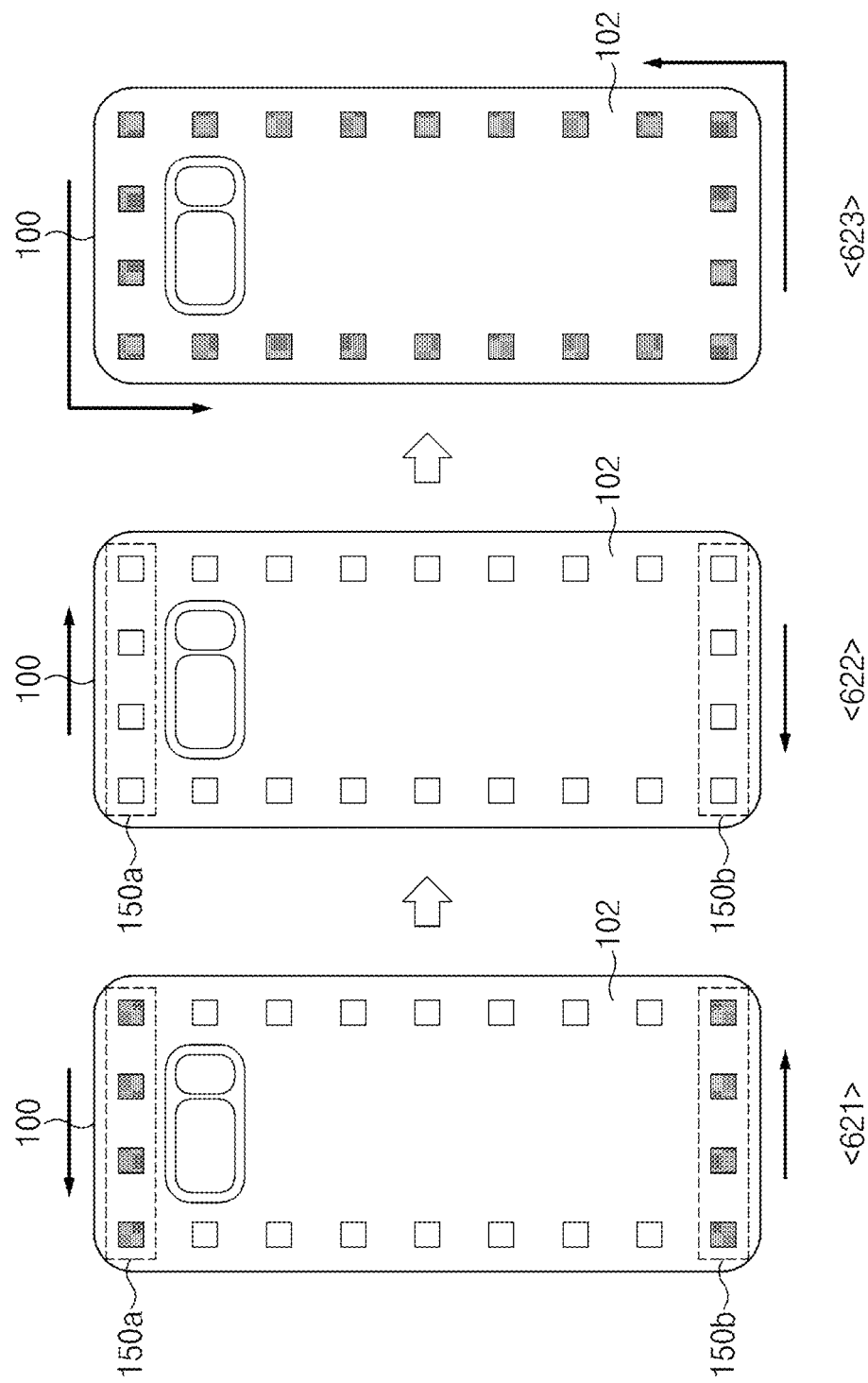
Figure 6C:
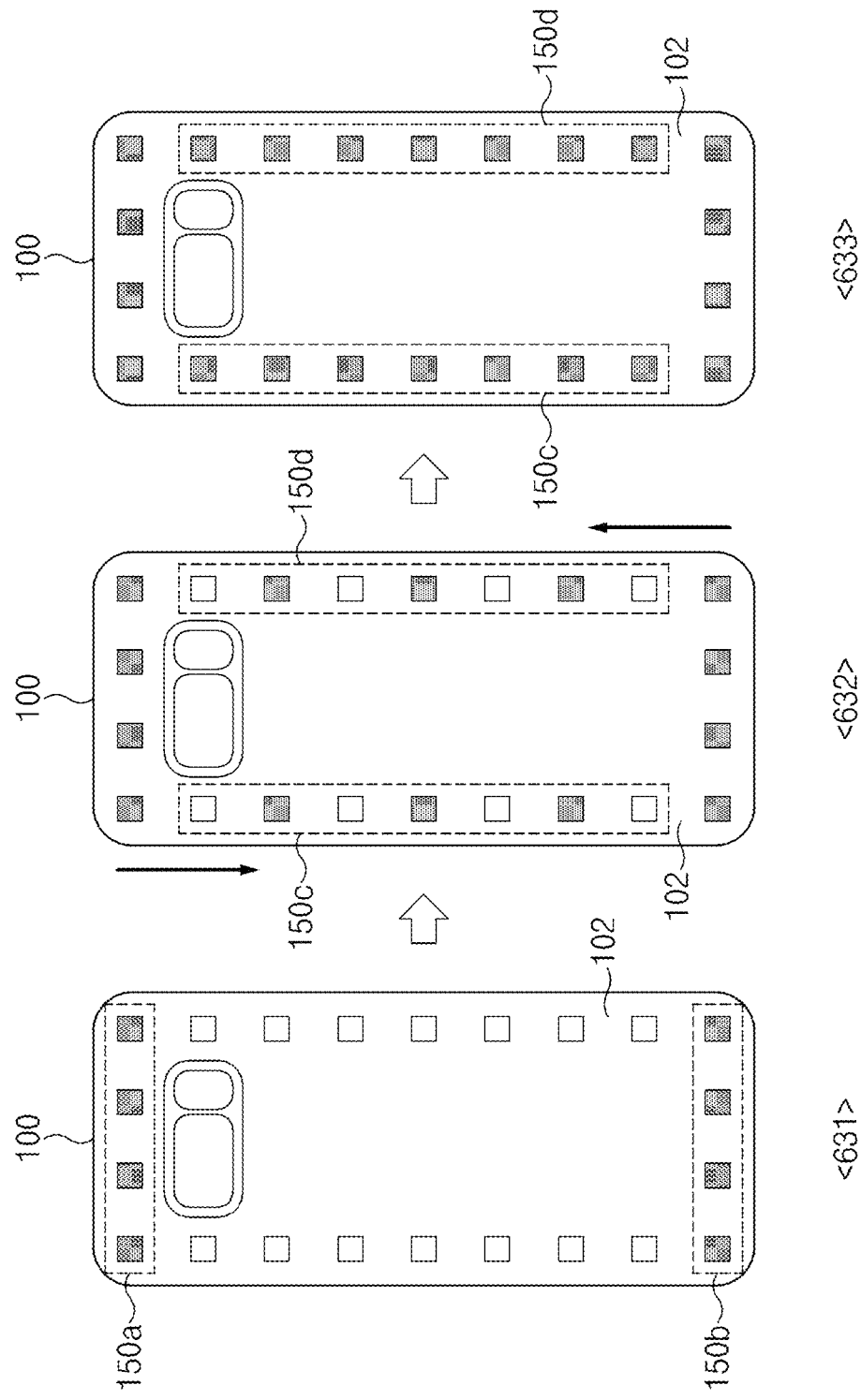

FIGS. 6A to 6C show an example of guiding an extent to which a filming time point has reached using a plurality of second light emitting elements according to an embodiment.

Referring to FIG. 6A, in operation 611, the electronic device 100 (e.g., the electronic device 100 in FIG. 1) may light a second light emitting element disposed on one side (e.g., the right side) of the top of the rear surface plate 102 and a second light emitting element disposed on the other side (e.g., the left side) of the bottom of the rear surface plate 102 first among the plurality of second light emitting elements 150.

In operations 612 and 613, the electronic device 100 may sequentially light the plurality of second light emitting elements 150 in an ascending order (e.g., in a counterclockwise direction) of a distance from the second light emitting elements respectively disposed one side of the top of the rear surface plate 102 and the other side of the bottom of the rear surface plate 102, starting from the second light emitting elements respectively disposed one side of the top of the rear surface plate 102 and the other side of the bottom of the rear surface plate 102.

Referring to FIG. 6B, in operation 621, the electronic device 100 may light second light emitting elements 150a arranged on the top of the rear surface plate 102 in an order from one side (e.g., the right side) to the other side (e.g., the left side). At the same time, the electronic device 100 may light second light emitting elements 150b arranged on the bottom of the rear surface plate 102 in an order from the other side to the right side.

In operation 622, the electronic device 100 may turn off the second light emitting elements 150a arranged on the top of the rear surface plate 102 in the order from the other side to one side. At the same time, the electronic device 100 may turn off the second light emitting elements 150b arranged on the bottom of the rear surface plate 102 in the order from one side to the other side.

In operation 623, the electronic device 100 may sequentially light the plurality of second light emitting elements 150 in the counterclockwise direction starting from the second light emitting element disposed on one side of the top of the rear surface plate 102 and the second light emitting element disposed on the other side of the bottom of the rear surface plate 102.

Referring to FIG. 6C, after the second light emitting elements arranged on the top and the bottom of the rear surface plate 102 are lit in operation 631 (e.g., in operation 621), in operation 632, the electronic device 100 may sparsely light second light emitting elements 150c arranged on the left side and second light emitting elements 150d arranged on the right side of the rear surface plate 102 respectively in specified orders (e.g., in the direction from the top to the bottom and the direction from the bottom to the top) in units of a specified number.

In operation 633, the electronic device 100 may light second light emitting elements that are not lit among the second light emitting elements 150c arranged on the left side and the second light emitting elements 150d arranged on the right side of the rear surface plate 102 in a specified order.

According to various embodiments, the order in which the electronic device 100 lights the plurality of second light emitting elements 150 is not limited thereto. For example, the electronic device 100 may light one or three or more second light emitting elements first and then light the plurality of second light emitting elements 150 in at least one of the direction from one side to the other side, the direction from the top to the bottom, the clockwise direction, and the counterclockwise direction.

According to various embodiments, a lighting pattern (e.g., the lighting order) of the plurality of first light emitting elements 140 shown in FIGS. 5A and 5B and a lighting pattern of the plurality of second light emitting elements 150 shown in FIGS. 6A to 6C may be mixed.

Figure 7A:
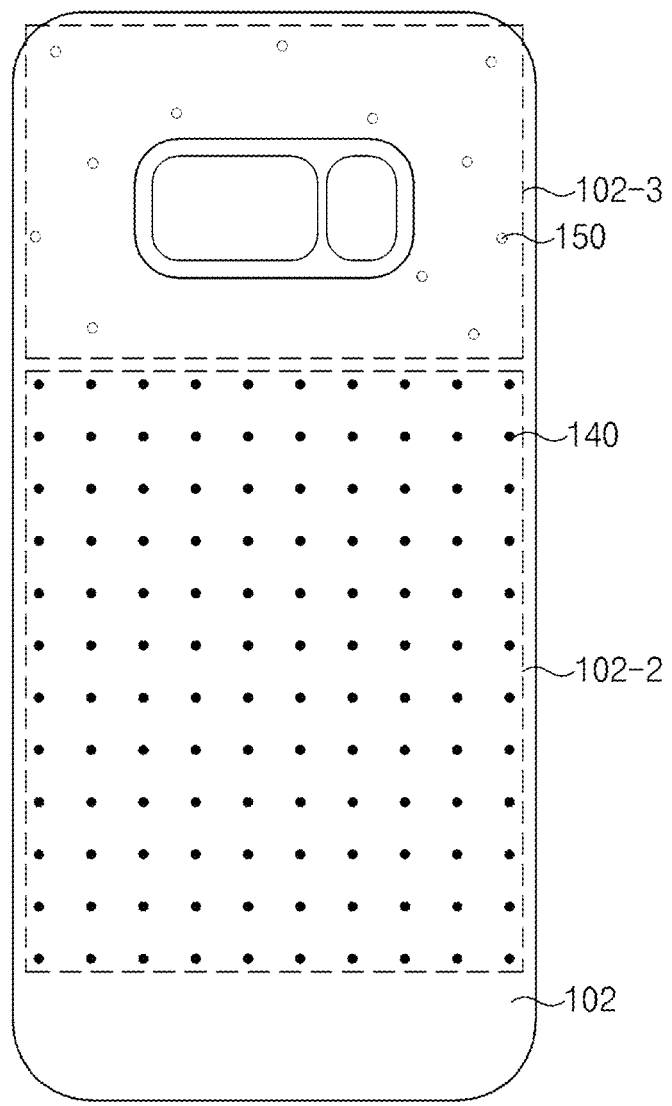
FIGS. 7A to 7C show another arrangement example of a plurality of first light emitting elements and a plurality of second light emitting elements according to an embodiment.
Figure 7B:
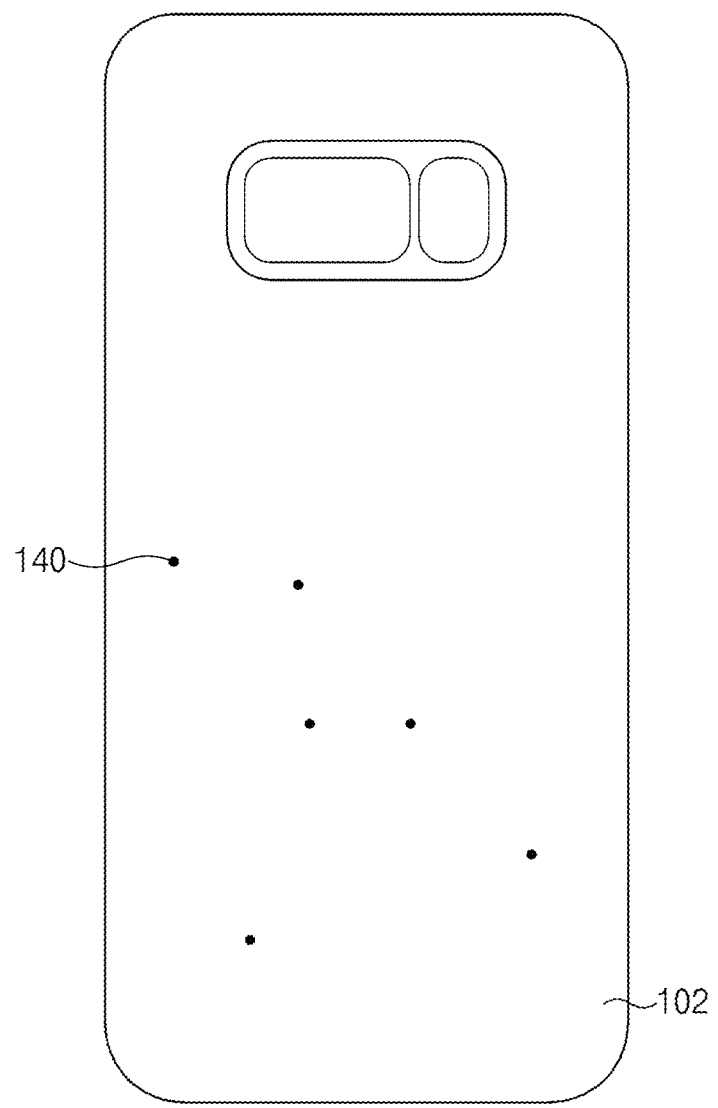
Figure 7C:
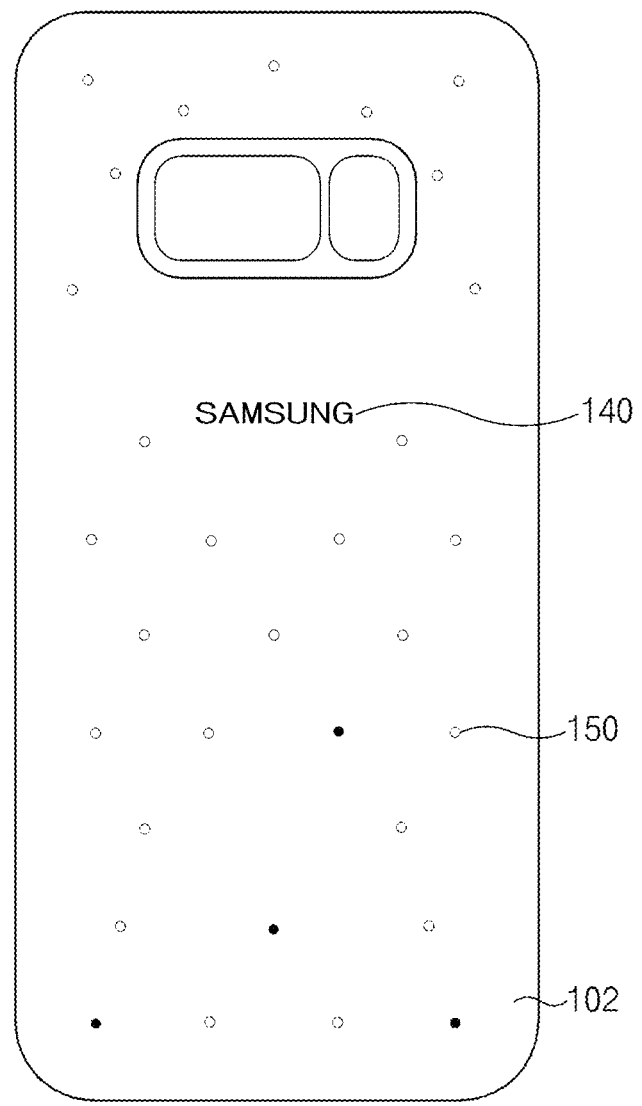

FIGS. 7A to 7C show another arrangement example of a plurality of first light emitting elements (e.g., the plurality of first light emitting elements 140 in FIG. 1) and a plurality of second light emitting elements (the plurality of second light emitting elements 150 in FIG. 1) according to an embodiment.

Referring to FIG. 7A, the plurality of first light emitting elements 140 may be densely arranged to form a rectangular shape. The plurality of second light emitting elements 150 may be irregularly and sparsely arranged. In this case, the second portion 102-2 of the rear surface plate 102 (e.g., 110B in FIG. 1) may be formed entirely transparently, or regions where the plurality of first light emitting elements 140 are exposed may be formed transparently. In addition, the second portion 102-3 of the rear surface plate 102 may be formed entirely transparently, or at least regions through which the plurality of second light emitting elements 150 are respectively exposed may be formed transparently.

Referring to FIG. 7B, the plurality of first light emitting elements 140 may be irregularly and sparsely arranged. In FIG. 7B, the second portion 102-2 of the rear surface plate 102 may be formed to expose each of the plurality of first light emitting elements 140.

Referring to FIG. 7C, the second portion 102-2 of the rear surface plate 102 may be formed in a specified logo (e.g., a manufacturer logo or a product name logo) shape, and the plurality of first light emitting elements 140 may be arranged in a row (or a plurality of rows). In this case, the lit plurality of first light emitting elements 140 may display the specified logo. In addition, the plurality of second light emitting elements 150 may be sparsely arranged on the rear surface plate 102 irregularly (or following a certain rule).

Figure 8:
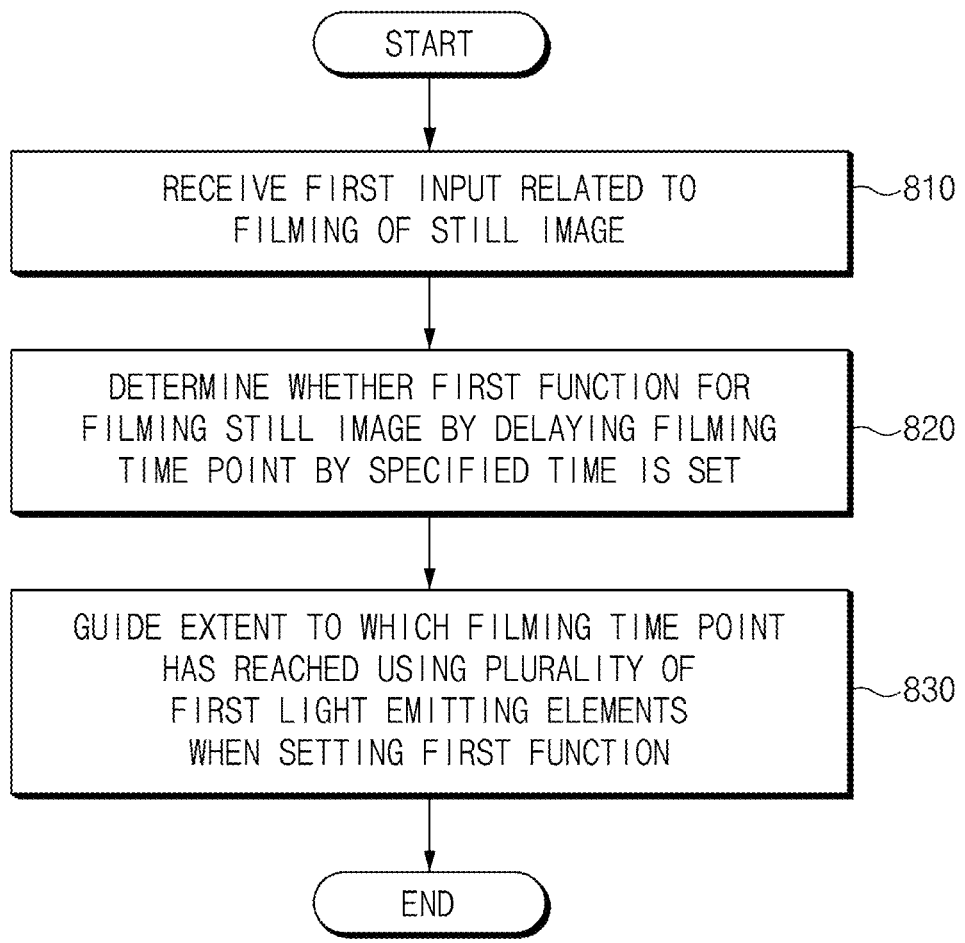
FIG. 8 shows a flowchart of a filming-related information guide method according to an embodiment.

FIG. 8 shows a flowchart of a filming-related information guide method according to an embodiment.

Referring to FIG. 8, in operation 810, the electronic device 100 (e.g., the electronic device 100 in FIG. 1) may receive the first input related to the filming of the still image using the camera 130 (e.g., the camera 130 in FIG. 1). The first input may be, for example, the input requesting the filming of the still image received while displaying the image acquired using the camera 130 on the display 120 in the preview mode.

In operation 820, when receiving the first input related to filming of a still image using the camera, the electronic device 100 may determine whether the first function for filming the still image with a filming delay of a specified time is set. The filming time point may be, for example, the time point for reading out the still image from the camera 130 after receiving the input related to the still image filming. The specified time may be, for example, the time set by the user input. For example, when the filming time point when the first function is not set is after the first time (e.g., 1 second) after receiving the first input, the filming time point when the first function is set may be after the sum of the first time and the specified time (e.g., 5 seconds) after receiving the first input.

In operation 830, when the first function is set, the electronic device 100 may indicate a progression of the filming delay using the plurality of first light emitting elements 140. For example, the electronic device 100 may use the plurality of first light emitting elements 140 to display the at least one of the character, the symbol, and/or the number corresponding to the progression of the filming delay such that the filming of the still image is distinguished from the filming delay. As another example, the electronic device 100 may display the numbers (e.g., 3→2→1) counting down the filming time point using the plurality of first light emitting elements 140, and may display the symbol (e.g., the camera shape) indicating an ending of the filming delay using the plurality of first light emitting elements 140 at the end of the filming delay.

According to the above-described embodiment, the electronic device 100 may increase the convenience of the image filming using the camera 130 exposed through the rear surface plate 102 and the fun of the interaction.

According to various embodiments, a method for guiding filming-related information by an electronic device (e.g., the electronic device 100 in FIG. 3) may include an operation of receiving a first input related to filming of a still image using a camera exposed through a first portion of a rear surface plate of the electronic device, an operation of determining whether a first function for filming the still image with a filming delay of a specified time is set when the first input is received, and an operation of indicating progression of the filming delay using a plurality of first light emitting elements exposed through a second portion of the rear surface plate when a timer filming function is set.

The operation of indicating a progression of the filming delay may include an operation of displaying at least one of a character, a symbol, and/or a number indicating the progression of the filming delay such that the filming of the still image is distinguished from the filming delay.

The operation of indicating the progression of the timing delay may further include an operation of lighting at least some of the plurality of first light emitting elements with first brightness at an end of the filming delay to indicate filming of the still image, and an operation of adjusting the brightness of the at least some of the plurality of first light emitting elements from the first brightness to second brightness less than the first brightness and then turning off the at least some of the plurality of first light emitting elements after the end of the filming delay.

The method may further include an operation of sequentially lighting a plurality of second light emitting elements exposed through a third portion of the rear surface plate based on the progression of the filming delay.

The operation of sequentially lighting the plurality of second light emitting elements may include sequentially turning on and off at least some of the plurality of second light emitting elements at least once; and sequentially lighting the plurality of second light emitting elements based on the progression of the filming delay.

The method may further include an operation of stop indicating the progression of the filming delay, and indicating a specified event when the specified event occurs while guiding the progression of the filming delay.

The method may further include an operation of determining whether an external object is within a specified distance range from the electronic device based on an image acquired using the camera, and an operation of guiding a movement of the external object using the plurality of first light emitting elements to be within the specified distance range when the external object is beyond the specified distance range.

The method may further include an operation of sensing a grip pattern of a user on the electronic device using a sensor circuit, and an operation of setting or cancelling a function of indicating based on the sensed grip pattern.

The method may further include an operation of determining whether a second function, for filming a moving image at a second frame rate exceeding a default set first frame rate, is set when receiving a second input related to the filming of the moving image using the camera, and an operation of indicating that the second function is set using the plurality of first light emitting elements when the second function is set.

Figure 9:
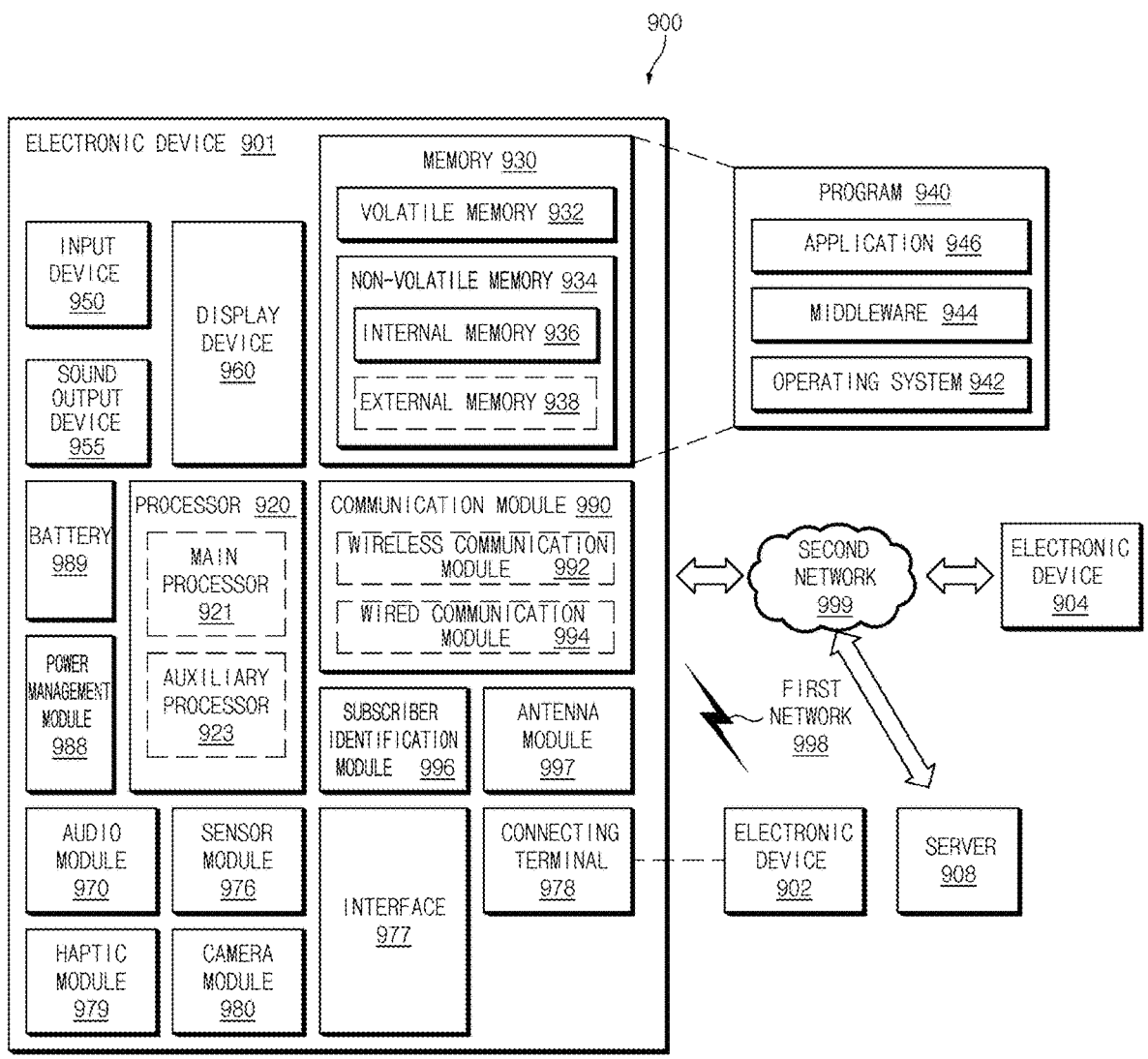
FIG. 9 is a block diagram illustrating an electronic device in a network environment according to various embodiments.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a housing including a front surface plate, and a rear surface plate opposite to the front surface plate;
   a display exposed through at least a portion of the front surface plate;
   a camera exposed through a first portion of the rear surface plate;
   a plurality of first light emitting elements exposed through a second portion of the rear surface plate around the first portion;
   a processor operatively connected to the display, the camera, and the plurality of first light emitting elements; and
   a memory operatively connected to the processor, wherein the memory is configured to store instructions that, when executed, cause the processor to:
      when a first input related to filming of a still image using the camera is received, determine whether a first function of filming the still image with a filming delay of a specified time is set;
      indicate progression of the filming delay using the plurality of first light emitting elements when the first function is set;
      determine whether a second function, for filming a moving image at a second frame rate exceeding a default set first fame rate, is set when receiving a second input related to the filming of the moving image using the camera; and
      indicate that the second function is set using the plurality of first light emitting elements when the second function is set.

2. The electronic device of claim 1, wherein the instructions cause the processor to display at least one of a character, a symbol, and a number indicating the progression of the filming delay such that the filming of the still image is distinguished from the filming delay.

3. The electronic device of claim 1, wherein the instructions cause the processor to:
   light at least some of the plurality of first light emitting elements with a first brightness at an end of the filming delay to indicate filming of the still image; and
   adjust a brightness of the at least some of the plurality of first light emitting elements from the first brightness to a second brightness less than the first brightness and then turn off the at least some of the plurality of first light emitting elements after the end of the filming delay.

4. The electronic device of claim 1, further comprising:
   a plurality of second light emitting elements exposed through a third portion of the rear surface plate,
   wherein the instructions further cause the processor to sequentially light the plurality of second light emitting elements based on the progression of the filming delay.

5. The electronic device of claim 4, wherein the instructions further cause the processor to:
   sequentially turn on and off at least some of the plurality of second light emitting elements at least once, and after the at least once sequential turning on and off of the plurality of second light emitting elements, sequentially light the plurality of second light emitting elements based on the progression of the filming delay.

6. The electronic device of claim 4, wherein the instructions further cause the processor to:
light the plurality of second light emitting elements with a third brightness at an end of the filming delay; and
adjust a brightness of the plurality of second light emitting elements from the third brightness to a fourth brightness less than the third brightness at least once and then turn off the plurality of second light emitting elements after the end of the filming delay.

7. The electronic device of claim 1, wherein the instructions further cause the processor to:
stop indicating the progression of the filming delay, and
indicate a specified event when the specified event occurs while indicating the progression of the filming delay.

8. The electronic device of claim 1, wherein the instructions cause the processor to:
determine whether an external object is within a specified distance range from the electronic device based on an image acquired using the camera; and
guide a movement of the external object using the plurality of first light emitting elements to be within the specified distance range when the external object is beyond the specified distance range.

9. The electronic device of claim 1, further comprising:
a sensor circuit capable of sensing a grip of a user on the electronic device,
wherein the instructions further cause the processor to set or cancel a function of indicating progression of the filming delay based on a pattern of the grip sensed using the sensor circuit.

10. The electronic device of claim 1, wherein the instructions further cause the processor to indicate a specified event using the plurality of first light emitting elements when the specified event occurs while filming the moving image after the second input is received.

11. A method for guiding filming-related information by an electronic device, the method comprising:
receiving a first input related to filming of a still image using a camera exposed through a first portion of a rear surface plate of the electronic device;
when the first input related to the filming of the still image is received, determining whether a first function of filming the still image with a filming delay of a specified time is set;
indicating progression of the filming delay using a plurality of first light emitting elements exposed through a second portion of the rear surface plate when the first function is set;
determining whether a second function, for filming a moving image at a second frame rate exceeding a default set first frame rate, is set when receiving a second input related to the filming of the moving image using the camera; and
indicating that the second function is set using the plurality of first light emitting elements when the second function is set.

12. The method of claim 11, wherein indicating the progression of the filming delay includes:
displaying at least one of a character, a symbol, and a number indicating the progression of the filming delay such that the filming of the still image is distinguished from the filming delay.

13. The method of claim 11, wherein indicating the progression of the filming delay further includes:
lighting at least some of the plurality of first light emitting elements with a first brightness at an end of the filming delay to indicate filming of the still image; and
adjusting a brightness of the at least some of the plurality of first light emitting elements from the first brightness to a second brightness less than the first brightness and then turning off the at least some of the plurality of first light emitting elements after the end of the filming delay.

14. The method of claim 11, further comprising:
sequentially lighting a plurality of second light emitting elements exposed through a third portion of the rear surface plate based on the progression of the filming delay.

15. The method of claim 14, further comprising:
sequentially turning on and off at least some of the plurality of second light emitting elements at least once, and
then, sequentially lighting the plurality of second light emitting elements based on the progression of the filming delay.

16. The method of claim 14, further comprising:
lighting the plurality of second light emitting elements with a third brightness at an end of the filming delay; and
adjust a brightness of the plurality of second light emitting elements from the third brightness to a fourth brightness less than the third brightness at least once and then turn off the plurality of second light emitting elements after the end of the filming delay.

17. The method of claim 11, further comprising:
stopping the indicating of the progression of the filming delay, and
indicating a specified event when the specified event occurs while indicating the progression of the filming delay.

18. The method of claim 11, further comprising:
determining whether an external object is within a specified distance range from the electronic device based on an image acquired using the camera; and
guiding a movement of the external object using the plurality of first light emitting elements to be within the specified distance range when the external object is beyond the specified distance range.

19. The method of claim 11, further comprising:
setting or canceling a function of indicating progression of the filming delay based on a pattern of a grip sensed using a sensor circuit capable of sensing grip of a user on the electronic device.

* * * * *